United States Patent Office 3,248,225
Patented Apr. 26, 1966

3,248,225
METHOD FOR RECOVERING SOLIDS FROM WASTE FOOD LIQUORS AND ALLEVIATING STREAM POLLUTION
Harold E. Bode, Room 308, Schofield Bldg., Cleveland, Ohio
No Drawing. Filed June 7, 1963, Ser. No. 286,178
9 Claims. (Cl. 99—2)

This invention relates to novel procedures for precipitating or removing colloidally suspended stream polution materials; and is a continuation—in part—of my allowed U.S. patent application, Serial No. 25,481, which was filed on April 28, 1960, now U.S. Pat. No. 3,093,504.

In the allowed parent patent application, procedures for bringing about a substantially complete precipitation of a starch paste are described. The said parent patent application also points out that stream pollution caused by various organic or inorganic suspended materials, can be alleviated by applying the precipitation technique of a starch phosphate paste.

One object of this invention is to provide novel starch paste precipitating conditions which enable the simultaneous precipitation or coagulation of dispersed or colloidally suspended non-starch materials.

Another object of this invention is to alleviate stream pollution B.O.D. caused by food or animal feed wastes; by providing a means for the partial or substantially complete removal and reuse of said wastes by means of an edible starch precipitant.

Still another object of this invention is to provide a starch paste or solution precipitating procedure which enables, in the presence of suspended non-starch particles within said starch paste the simultaneous production of insoluble metal starch derivatives capable of functioning as coating, sizing, food, feed, or pigment adjuncts for the said suspended non-starch particles.

Numerous attempts have been made in the past to produce starch pastes capable of substantially complete precipitation out of a water solution. In the prior art, such attempts have almost invariably lead to incomplete precipitation of the starch dry substance from the aqueous starch gel. It is known, that a starch paste can be more or less completely precipitated by the addition of certain organic solvents such as the lower aliphatic alcohols. Such procedures are, however, impractical from a commercial standpoint; because it introduces volatile organic liquids which are expensive to recover after the starch has been precipitated.

Attempts have also been made to precipitate a starch paste by means of the formation of metal derivatives of starch, particularly barium starch. Such procedures are also costly and inefficient. This is because the starch granules must first be thoroughly gelatinized by means of an excess of caustic soda. The resulting viscous strongly alkaline starch paste can then be partially precipitated by addition of water soluble salts of cations, such as barium chloride. This results in the production of an insoluble precipitate of a barium derivative starch fraction. However, this precipitation is far from complete. Only a fraction of the total starch in the caustic starch paste ends up as an insoluble barium starch fraction. The remainder shows up as barium derivatives of various starch fractions having different degrees of solubility.

The recent commercial advent of phosphate-modified starches known as starch phosphates, have made possible, for the first time, a new type of starch functioning tool. The phosphated starches make possible the practical exploitation of the concept of substantially complete precipitation of an aqeuous starch gel, simultaneously with the production of metal starch derivatives having valuable physical or chemical properties.

It is known that starch pastes are capable of suspending, dispersing, or occluding finely divided oragnic or inorganic materials. In accordance with this invention, it has been found that, if a starch phosphate paste containing other suspended particles therein has the paste gel broken by means of starch precipitation in the form of a metal starch derivative, that this gel beraking and precipitating action enables a concomitant coagulation or settling of suspended non-starch finely comminuted materials.

It has also been found, according to this invention, that the resulting simultaneously produced metal starch precipitates have physical or chemical properties that can contribute to or integrate with the properties of the suspended non-starch particles.

Such partial or substantially complete depositing of suspended non-starch particles from a precipitated phosphated starch paste creates a new type of starch functioning tool which can be put to practical use in a variety of industries.

Examples where this combination of phosphated starch gel precipitation, metal starch derivative formation, and dispersed non-starch particle removal, may be exploited, are in the areas of the alleviation of B.O.D. or biological oxygen demand in stream pollution, the recovery of suspended egg dry substance from egg wastes produced by large egg breakeries, the recovery of packing house suspended waste materials, certain mineral pigment producing processes; and the treatment of asphalt emulsions, as well as the application of the treated asphalt emulsions, particularly in container board and insulating board manufacturing. Other examples are the treatment of various mineral ore suspensions; paper pulp processing; the treatment of rubber or other synthetic polymer latices; the removal of impurities from crude sugar liquors or molasses; and the treatment of subterranean crude petroleum emulsions.

Phosphated starch, also sometimes designated as orthophosphate esters of starch, can be readily prepared when starch is reacted with certain orthophosphate salts in accordance with certain prescribed procedures. This phosphated starch can be modified to either a simple or a cross-linked phosphate ester stage. The resulting phosphated starch can, if desired, be separated into phosphated starch fractions whose viscosity is radically higher than the whole non-fractionated starch portion.

For the purposes of this invention, phosphated starches having a bound phosphorous content of between 0.5 and 5.0 percent could be used. In general, these phosphated starches are prepared by heating a starch containing about 10 percent moisture in the presence of the sodium salts of orthophosphoric acid, at a temperature of between 120 and about 175° C. for a period of about 0.25 to 12 hours. Phosphated starches suitable for this invention, containing various amounts of bound phosphorous and having various degrees of cross-linking are described in the Louis W. Ferrara U.S. Patent 2,865,763; and the Ralph W. Kerr U.S. Patent 2,884,413; and the Hans Neukom U.S. Patent 2,884,412. Other prior art teaches various means for producing phosphated starches of low or high viscosities.

For many purposes, a phosphated starch containing about 2.0 percent of bound phosphorous will function satisfactorily from a starch paste precipitation as well as from a metal starch derivative formation standpoint. However, the particular degree of starch phosphation, as well as the particular metal starchate derivative which is formed during the precipitation of the phosphated starch paste will depend upon the particular end-use for which the phosphated starch is intended. This is because the physical properties of the resulting precipitated metal starch derivatives will vary with the kind of metal, as well as with the degree of phosphate ester formation.

It has been found that the important advantages of phosphated starch pastes for this invention, are the ability to obtain a substantially complete starch precipitation, the easy settling or decanting of many of the resulting metal starch derivatives, and the ability of the coagulating or precipitating starch paste to bring down with it suspended non-starch particles. Since the final deposit of the starch from the precipitated starch paste does not result in the form of free starch, but rather in the form of a metal starch derivative, the physical properties which result when such a starch product is deposited on such materials as paper fibers, textile fibers, pigments, or other suspended materials, are in turn modified. For example, the water resistance or grease resistance of a starch size deposited out of a phosphated starch paste as a calcium starch derivative or some other cationic starch derivative, is considerably greater than that which results if starch sizing particles are deposited out of ordinary, non-modified starch pastes.

For the efficient functioning of the process of this invention it is preferable, in most instances, that a phosphated starch and a starch paste precipitating soluble metal salt be used which results in the rapid formation of a granular, easy settling metal starch compound. However, in situations where the precipitated phosphated starch paste is used for the purpose of sizing or coating non-settled colloidally dispersed particles, the precipitated metal starch derivative need not be in a granular, easily decantable, form.

Numerous varieties of starch, such as corn, milo, wheat, tapioca, rice, waxy maize, and potato starches may be used to prepare suitable starch phosphates. Starch fractions or crude amylaceous materials may also be used for phosphating the carbohydrate. Examples are amylose, dextrins, roll gelatinized cold water soluble starches, finely comminuted degerminated corn meal, and dry milling refined wheat flour which has had a major portion of its protein and fiber removed by mechanical means, such as certain air aspiration procedures.

Certain starches may be preferable in specific instances. Thus, for example, tapioca and waxy starches would be preferable where an inherently lesser set-back paste property is desired; whereas corn or wheat starches would be preferable wherein inherently shorter paste properties are desired, such as print pastes or clay coatings for paper processing.

In addition to the phosphated starch property variables, the process exploited in this invention also deals with the metal starch derivatives which result during the precipitation of the phosphated starch paste. The physical nature of the precipitated metal starch derivative can be varied greatly by the kind of metal salt which is being used to precipitate the phosphated starch out of its gel, as well as by the nature of the original physical or chemical state of the amylaceous material used to produce the phosphated starch. These facts cerate a valuable manipulating tool that enables those using phosphated starch pastes to manipulate and modify not only the physical properties of the precipitated starch materials, but also the properties of either organic or inorganic suspended materials within such phosphated starch pastes. For example, the use of water soluble derivatives of calcium, barium, lead, or titanium, results in the precipitation, from a phosphated starch paste, of substantially granular metal starch compounds; whereas in the case of aluminum, zinc, or magnesium salts, the resulting corresponding metal starch derivative precipitates tend to be more finely dispersed, and more difficult to dehydrate. The phosphated starch paste can also be precipitated by mixtures of two or more water soluble metal salts, and the physical properties of the resutling starch paste precipitates will depend upon the particular combination of soluble salts used. The nature of the original amylaceous materials is another manipulating tool which makes possible the creation of a variety of colloidal suspending or coagulating conditions. It is believed that, due to the presence of the phosphate ester as an integral part of the starch molecule, phosphated starch pastes are capable of substantially complete precipitation with suitable cationic material, even though the original, non-phosphated, starch material may have been modified to a water soluble state corresponding to that of dextrins.

One example of a starch phosphate which is suitable for many uses specified in this invention is a starch product known as ARD–1230, sold by The American Maize-Products Company.

Other examples of phosphated starches which could be used are as follows:

EXAMPLE 1

*Phosphated waxy maize starch*

240 pounds by weight of sodium dihydrogen phosphate hydrate are dissolved in 2040 pounds of water at room temperature. Sufficient caustic soda is added to adjust the pH of the phosphate solution to 5.5 Add, with thorough agitation, 1710 parts of waxy maize starch.

Filter thoroughly the resulting phosphate wetted starch and dry the wet starch cake in a Proctor and Schwartz starch dryer to a moisture content of 10 percent.

Subject the above dry starch to a temperature of 175° C. for a period of 45 minutes in a continuous belt-type dextrinizer.

This results in the production of a phosphated starch containing 1.0 percent of bound phosphorous in the form of a phosphate ester group. This phosphated starch will have a fluidity of between about 1 and 5.

In place of a continuous belt-type dextrinizer, one may use a fluid bed heater type dextrinizer wherein the starch is heated while it is air-suspended. In this type of dextrinizer the same product will be obtained by subjecting the starch to a temperature of 175° C. for a period of about 15 minutes.

Fore some uses, the removal of excess orthophosphate reagent is preferable. This can be done by washing the batch of dry, esterified starch phosphate with aqueous alcohol, and then redrying.

EXAMPLE 2

*Phosphated wheat starch*

Example 1 was repeated as described, but with the exception that instead of using a waxy maize starch as the starting raw material, wheat starch was subjected to phosphating conditions until the resulting wheat starch phosphate contained about 2.0 percent of bound phosphorous, as phosphate ester groups.

EXAMPLE 3

*Phosphated crude amylaceous material*

A finely ground, degerminated corn meal was suspended in 125° F. water, stirred for one hour, and filtered. The resulting washed corn meal, substantially free of soluble, was then subjected to a phosphating treatment similar to that described in Example 1, but under conditions wherein the amylaceous material was heated while under air-suspension. The converting time was such as to cause the phosphating reagent to bring about a chemical addition of phosphate ester to the starch molecule in an amount corresponding to 3.2 percent of bound phosphorous.

EXAMPLE 4

*Precipitation of starch phosphate paste by adding lime*

A 5 percent starch phosphate paste was prepared by heating the starch phosphate sold under the trade name of ARD-1230 with water at 180° F. for 20 minutes. Upon the addition of five parts of lime per 100 parts of cooked starch phosphate paste, the entire starch paste precipitated, leaving a clear supernatant liquor.

EXAMPLE 5

*Precipitation of starch phosphate paste by adding barium hydroxide*

A 3 percent phosphated starch paste was prepared from phosphated wheat starch prepared per Example 2. 100 parts of this phosphated starch paste was then treated with 6 parts of barium hydroxide. This resulted in the rapid breakdown of the paste and the formation of a readily decantable barium starch phosphate precipitate.

EXAMPLE 6

In place of barium hydroxide, lead acetate trihydrate was used to precipitate the phosphated starch paste. It was found that most of the starch phosphate solids were readily precipitated.

EXAMPLE 7

*Alleviation of stream pollution B.O.D. caused by fish processing waste liquors*

A fish processing waste liquor containing 0.6 percent of fish waste was used as the liquid medium for the formation of a 0.6 percent phosphated starch paste, made from the crude phosphated starch described in Example 3. The resulting blend of phosphated starch paste and suspended fish wastes was then treated with lime in the proportion of one part of lime per 100 parts of the mixture of phosphated starch paste and fish wastes. The mixture was stirred for 30 minutes. Upon stopping the agitator, an insoluble flock of calcium starch phosphate, carrying with it suspended fish waste solids, quickly settled.

The treated liquor was centrifuged. The centrifuge solids, upon drying, comprised a blend of edible animal feed ingredients consisting of fish waste solids, corn proteins, and calcium starch derivative. The calcium enhanced the feed value of the recovered fish waste material, particularly when intended for poultry feed.

EXAMPLE 8

*Alleviation of stream pollution B.O.D. caused by meat packing house wastes*

A meat packing house waste liquor containing suspended or colloidally dispersed meat waste material, was used as the liquid medium for forming a phosphated starch paste. Lime was added in a manner similar to that described in Example 7. There resulted the recovery of a dried feed-grade material of enhanced feed value because of the presence of nutritionally valuable calcium.

EXAMPLE 9

*Alleviation of stream pollution B.O.D. caused by egg breakery waste liquor*

An egg breakery waste liquor containing 0.75 percent of egg solids was treated in a manner similar to that described in Example 7. The resulting dry blend of egg solids and calcium starch was suitable for animal feed purposes, particularly poultry feed, as well as for human consumption.

In the above examples, the starch phosphate paste precipitation properties are functioning as a tool for removing substantial amounts of B.O.D. forming impurities from industrial waste liquors, which ordinarily are sent into nearby streams. The same principles apply to similar food liquors which, do not necessarily, end up as total wastes going into a nearby stream. Industrial food liquors containing greater amounts of colloidally suspended food materials may, under certain circumstances, be advantageously treated by the above type of phosphated starch precipitating procedure for the purpose of recovering food solids. One example of such a situation is the treatment of crude sugar liquors containing non-sugar solids which lend themselves to removal by means of starch phosphate paste precipitation. Where the presence of common salt or sodium chloride is not objectionable, the lime for the phosphated starch precipitation could be replaced by calcium chloride.

Further examples of food processing liquors which could be advantageously treated by means of the phosphated starch precipitating procedure of this invention are various vegetable or fruit wastes, or by-product liquors of large canning plants; distillary slop liquors from alcoholic fermentation plants or breweries; and steep or other wash liquors obtained by the digestion or washing of various grains such as corn, barley, malt, oats, or various wheat products.

For example, in the case of steep water obtained from the steeping of corn in a wet corn milling plant, the suspended colloidal protein, as well as non-protein materials do not lend themselves to any practical means of settling. Such light corn steep water, which may have a gravity Bé ranging from about 2.0 to 5.0 must therefore be subjected to an expensive vacuum pan treatment, before these colloidal solids can be incorporated into an animal feed.

By taking such steep water, and using it as the liquid means for forming a phosphated starch paste, followed by the addition of lime, or some other suitable phosphated starch paste precipitating agent, a means is created for precipitating a substantial portion of steep water solids, without resorting to expensive vacuum pan dehydration. The particular steep water pH which should be used for the pasting of the phosphated starch will depend on the kind of steep water precipitation which is being sought. In most cases, advantageous precipitations will be obtained by preparing a phosphated starch paste with light steep water having a pH range of 5.0 to 7.0. In some cases, it may be desirable to use the lime which will be used for the starch phosphate paste precipitation, also as the means for adjusting the pH of the steep water, before the addition of the starch paste with the steep water.

In other cases, the use of calcium chloride instead of lime to precipitate the step water starch phosphate paste may be desirable, since by this means, sodium chloride would be produced. The latter is a valuable ingredient of animal feed.

In situations where no central wet corn milling plant facilities are available, corn, or other grains, can be advantageously treated by washing comminuted grain with warm water, and subsequently using the said wash water as a means for pasting phosphated starch, and then bringing down the suspended solids in the wash water by breaking the phosphated starch paste with lime.

In all of the above examples involving the recovery and use of suspended edible materials, the factor which makes such procedures economically attractive, is the fact the gel, as well as the means for breaking the gel and introducing a metal derivative, all operate with original materials and reagents which are edible. Thus, phosphated starch, pastes thereof, and calcium starch derivatives obtained by the addition of lime or calcium chloride, are all products which, being edible, lend themselves to reuse, thus minimizing processing costs.

The phosphated starch paste precipitating procedures of this invention also enables the novel treatment of non-edible, finely suspended or dispersed, organic or inorganic materials. One example, is in the realm of paper sizing procedures. Another example is in the realm of the modification of asphalt emulsions, as well as the end-use of such asphalt emulsions. Still another example, is the treatment of various aqueously suspended minerals, particularly in the realm of wet ore processing in the mining industry.

In the case of paper sizing, many efforts have been made in the past to develop a paper size that would set on the alkaline side. This is because, under the commonly used acid pH conditions, paper undergoes bursting strength losses of as much as 15 percent, as indicated by the bursting test. When the pH of the paper pulp liquor is above 7, the resulting paper normally tests much higher. In the case of sizing material such as alum, or alum in conjunction with asphalt or rosin size, present practice usually calls for an acid pH medium. This is because, a pH of about 4.8 to 5.0 is necessary for efficient sizing purposes, as now practiced.

By means of a phosphated starch paste, followed by a precipitation of the said paste by means of lime or some other soluble cationic derivative capable of precipitating the starch phosphate, it becomes possible to provide a sizing process which functions above 7 pH.

The above ability to carry out a sizing action of above 7 pH is of particular value in the case of the sizing or coating of paper insulating board or container board by means of asphalt emulsions. The addition of a phosphated starch paste to an asphalt emulsion makes it possible to process the asphalt at a neutral or slightly alkaline pH, instead of at a slightly acid pH.

In addition to the pH advantage, the use of phosphated starch paste in conjunction with an asphalt emulsion, makes possible the precipitation or the deposit of the colloidal asphalt particles upon the cellulose fabric, in conjunction with a metal starch derivative precipitate. Since metal starch derivatives are more water-resistant than starch itself, the combination of a precipitated or coagulated deposit of asphalt particles and metal starch derivative particles provides a superior sizing or coating.

As one example of the application of the phosphated starch paste and precipitating principle to asphalt paper processing, 100 parts of a 50 percent solids asphalt emulsion was mixed with a phosphated starch paste. To this mixture there was added a paper pulp suspension, followed by the addition of 3 parts of lime. The resulting blend of paper pulp, precipitated asphalt particles, and precipitated metal starch derivatives was formed into a sheet of paper and dried. The resulting paper was superior to similar paper made with asphalt emulsion under acidic pH condition, from the standpoint of bursting strength, water-resistance, and grease resistance.

Different soluble cation metal salts can be used in place of lime and calcium chloride. Examples are magnesium chloride, zinc sulphate, barium chloride, or soluble titanium salts.

Examples of mineral ore resuspensions which can be advantageously processed by means of the combined phosphated starch paste and paste precipitation procedure of this invention, are iron ores such as Teconite, bauxite, aluminum ore, phosphate rock, and uranium processing liquors.

Certain mineral leaching processes producing metal salt solutions may also be advantageously subjected to the process of this invention. Examples are iron salt pickling liquor produced in steel plants, various metal salt solution by-products obtained in metal plating such as nickel plating or chrome plating, and certain leach liquors obtained in uranium or manganese ore processing.

In oil well drilling, and in other phases of crude oil recovery, the phosphated starch paste precipitating technique provides a novel tool for manipulating subterranean crude oil deposit conditions by exploiting the phenomenon of efficiently breaking a blend of a phosphated starch paste with crude petroleum, by means of the above said paste precipitating procedures.

While I have illustrated and described a precise arrangement for carrying the invention into effective use, this is capable of many variations and alterations without departing from the spirit of the invention. I therefore do not wish to be limited by the description of this specification, but desire to avail myself of such changes as may fall within the spirit and scope of the appended claims.

What I claim as new, and desire to secure by Letters Patent of the United States, is as follows:

1. A method for collecting aqueously suspended non-starch particles, which comprises:
    (1) Treating an amylaceous material with salts of orthophosphoric acid to convert its starch content to orthophosphate esters of starch having a bound phosphorous content of between 0.5 and 5.0 percent,
    (2) Producing a starch gel by adding the said converted amylaceous material containing starch ester to the said non-starch aqueous suspension, and
    (3) Adding a sufficient amount of a water soluble cationic metal salt precipitant of orthophosphate esters of starch to simultaneously break the said starch gel and cause the simultaneous precipitation of suspended non-starch particles and an insoluble metal starchate comprising the cationic metal derivative of the said phosphoric acid ester of starch.

2. The process of claim 1 wherein the aqueously suspended particles are edible.

3. The process of claim 1 wherein the aqueously suspended particles are minerals.

4. A method for concentrating solids in fine aqueous suspension, which comprises:
    (1) Providing an amylaceous material whose starch content has been converted to phosphoric acid esters of starch having a bound phosphorous content of between 0.5 and 5.0 percent and adding it to the said aqueous suspension to produce a starch paste in said suspension,
    (2) Breaking the gel of the said starch paste by adding a water soluble cationic metal salt precipitant of the said starch ester, and
    (3) Collecting the resulting precipitated blend of metal starchate and occluded solids, said metal starchate comprising the cationic metal derivative of the said phosphoric acid ester of starch.

5. The process of claim 4 wherein the fine aqueous suspension is a meat packing house processing liquor.

6. The process of claim 4 wherein the fine aqueous suspension is an egg breaking processing liquor.

7. The process of claim 4 wherein the fine aqueous suspension is a crude sugar liquor.

8. A method of alleviating stream pollution by decreasing the biological oxygen demand, which comprises:
    (1) Treating an amylaceous material with salts of orthophosphoric acid to convert its starch content to orthophosphate esters of starch having a bound phosphorous content of between 0.5 and 5.0 percent,
    (2) Producing an aqueous starch gel from the said starch ester,
    (3) Adding the said starch ester gel to waste liquors containing suspended solids which would pollute the stream before the waste liquors enter the said stream, and
    (4) Adding to the starch ester gel containing waste liquors a sufficient amount of a water soluble metal salt precipitant of orthophosphate esters of starch to simultaneously break the said starch gel and cause the simultaneous precipitation of an insoluble metal starchate comprising the metal derivative of the said phosphoric acid ester of starch, and
    (5) Removing the resulting mixture of metal starchate derivative and occluded and precipitated stream pollution solids.

9. A method for alleviating stream pollution caused by waste food liquors containing suspended food solids, and simultaneously recovering said food solids in edible form, which comprises:
    (1) Adding the alkali metal salt of an orthophosphate ester of starch to aqueous waste food liquors prior to entering the said stream to produce a paste of said starch ester in said aqueous waste food liquor,
    (2) Adding sufficient lime to precipitate the said phosphated starch paste in the form of a calcium starch phosphate, and
(3) Removing the resulting blend of edible calcium starch phosphate occluded with waste food liquor solids.

References Cited by the Examiner

UNITED STATES PATENTS

| | | | |
|---|---|---|---|
| 2,318,919 | 5/1943 | Brockman | 210—53 |
| 2,354,662 | 8/1944 | Bryce | 117—156 |
| 2,549,177 | 4/1951 | Davidson | 117—156 |
| 2,680,072 | 6/1954 | Marrone | 162—175 |
| 2,692,824 | 10/1954 | Yarber | 162—175 |
| 2,725,313 | 11/1955 | Smith et al. | 127—34 |
| 3,079,331 | 2/1963 | Gieseke | 210—53 |
| 3,142,638 | 7/1964 | Blaisdell et al. | 210—52 |

FOREIGN PATENTS 705,906  3/1954  Great Britain.

OTHER REFERENCES

Brautlecht: Starch, Its Sources, Production and Uses, 1953, Reinhold Publishing Corp., New York, pp. 299, 369 and 370. Pg. 299 relied on.

"Phosphate Gives Starch New Properties," C & EN, June 27, 1960, page 84.

MORRIS O. WOLK, *Primary Examiner.*